(No Model.) 8 Sheets—Sheet 1.

C. MILLER.
HARVESTER.

No. 436,798. Patented Sept. 23, 1890.

Witnesses:
James H. French
Frank R. Rathbun

Inventor:
Charles Miller
By Cyrenus Wheeler
Attorney.

(No Model.) 8 Sheets—Sheet 2.

C. MILLER.
HARVESTER.

No. 436,798. Patented Sept. 23, 1890.

(No Model.) 8 Sheets—Sheet 5.

C. MILLER.
HARVESTER.

No. 436,798. Patented Sept. 23, 1890.

Witnesses:
Frank R. Rathbun,
William W. Grinnell

Inventor:
Charles Miller
By Cyrenus Wheeler
Attorney.

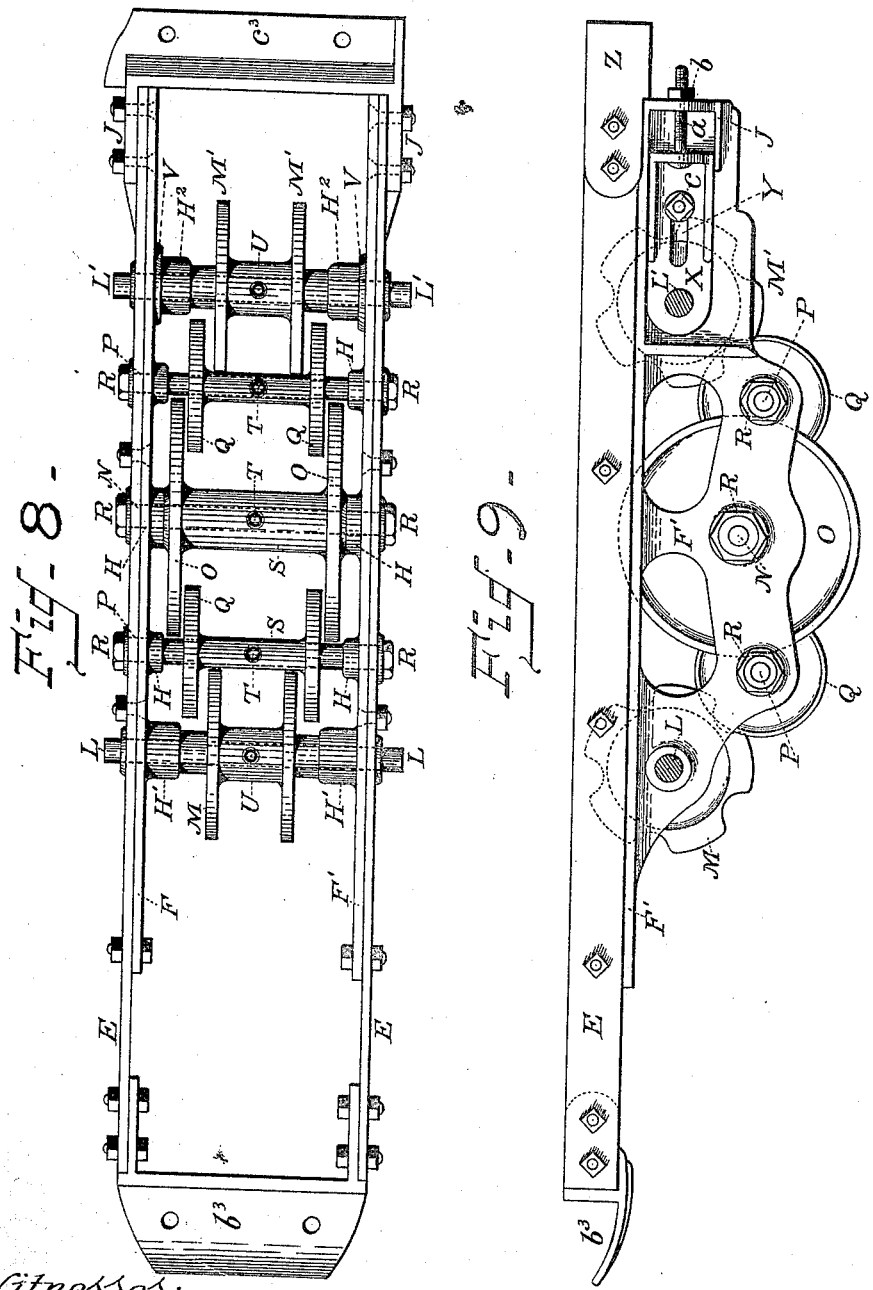

(No Model.) 8 Sheets—Sheet 7.

C. MILLER.
HARVESTER.

No. 436,798. Patented Sept. 23, 1890.

Witnesses:
Frank R. Rathbun,
William W. Grinnell

Inventor:
Charles Miller
By Cyrenus Wheeler
Attorney.

(No Model.) 8 Sheets—Sheet 8.

C. MILLER.
HARVESTER.

No. 436,798. Patented Sept. 23, 1890.

Witnesses:
Frank R. Rathbun,
William V. Grinnell

Inventor:
Charles Miller
By Cyrenus Wheeler
Attorney.

UNITED STATES PATENT OFFICE.

CHARLES MILLER, OF AUBURN, NEW YORK, ASSIGNOR OF ONE-FOURTH TO CYRENUS WHEELER, JR., OF SAME PLACE.

HARVESTER.

SPECIFICATION forming part of Letters Patent No. 436,798, dated September 23, 1890.

Application filed February 29, 1888. Serial No. 265,762. (No model.)

*To all whom it may concern:*

Be it known that I, CHARLES MILLER, a citizen of the United States, residing at the city of Auburn, in the county of Cayuga and State of New York, have invented new and useful Improvements in Harvesting-Machines, of which the following is a specification.

The object of my invention is to dispense with the elevating mechanism in use in harvesters that cut, gather, bind, and discharge the crop across and outside of the path in which the main supporting and driving wheel travels.

The invention consists in the substitution of a traction-wheel consisting of a hinged track or chain traveling over rollers and sprocket-wheels in such a path that its upper ply will be nearly horizontal for the usual main or supporting wheel. I attain these objects by the mechanism illustrated in the accompanying set of drawings on eight sheets, in which—

Figure 1:
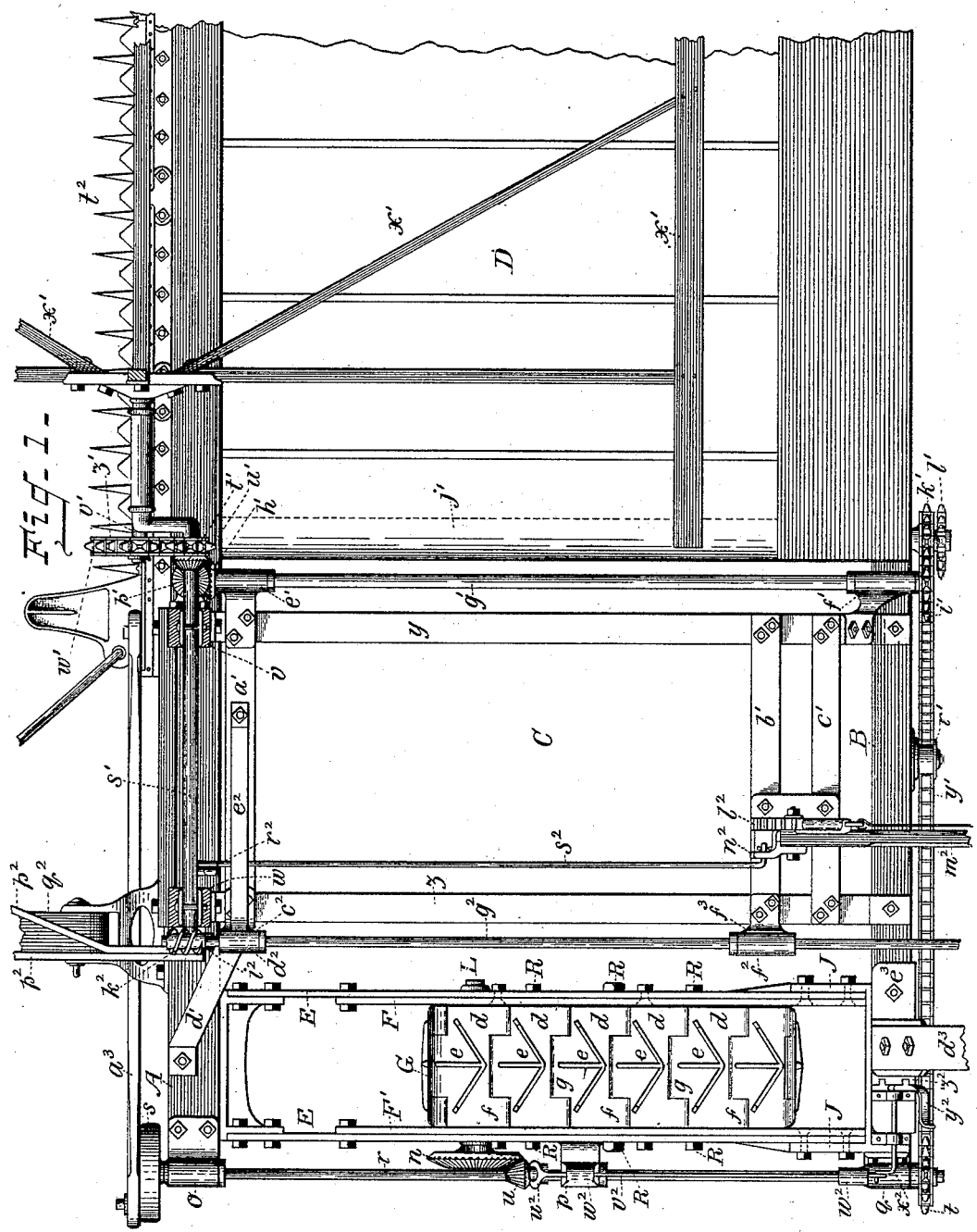
Figure 2:
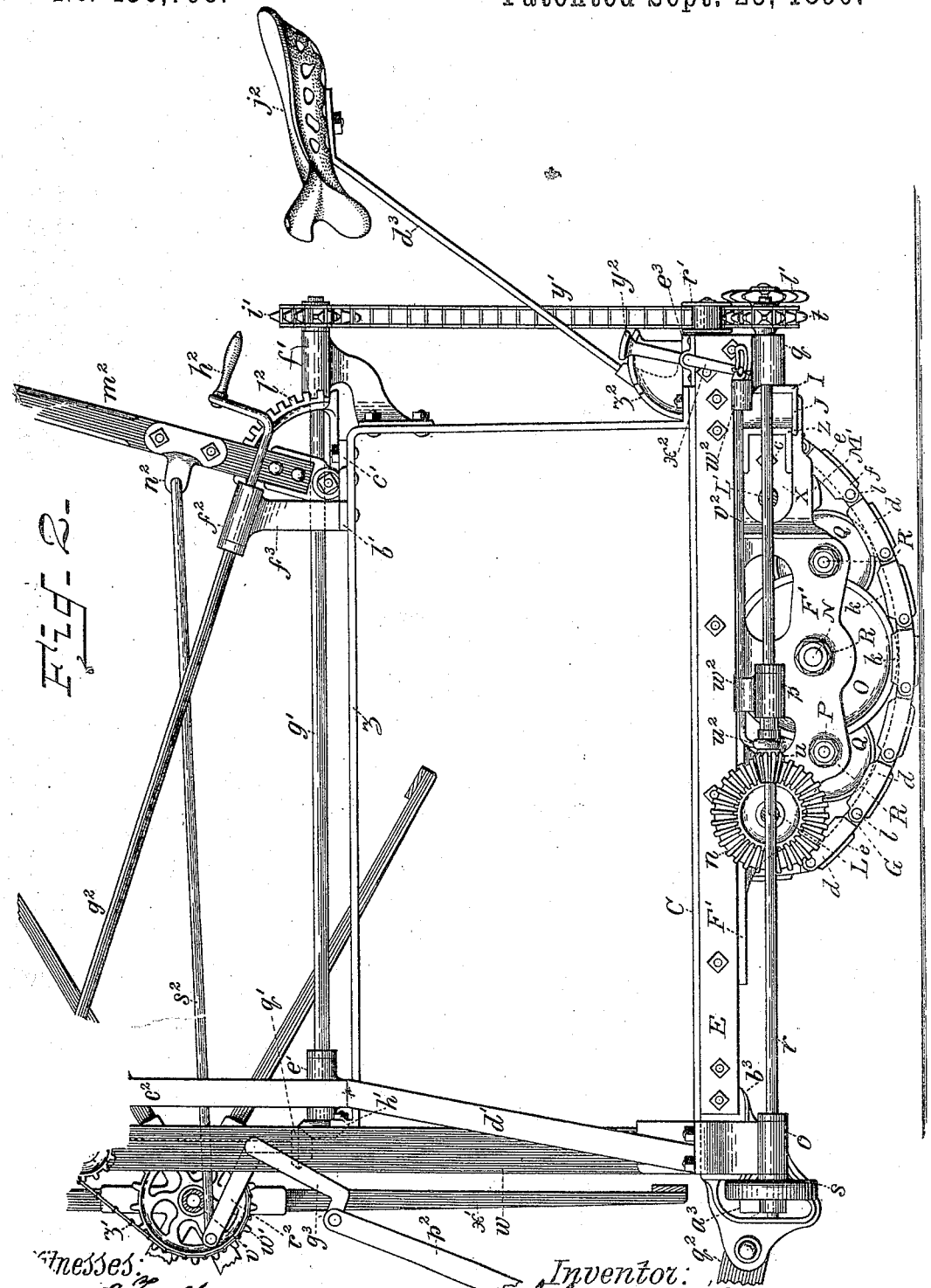
Figure 3:
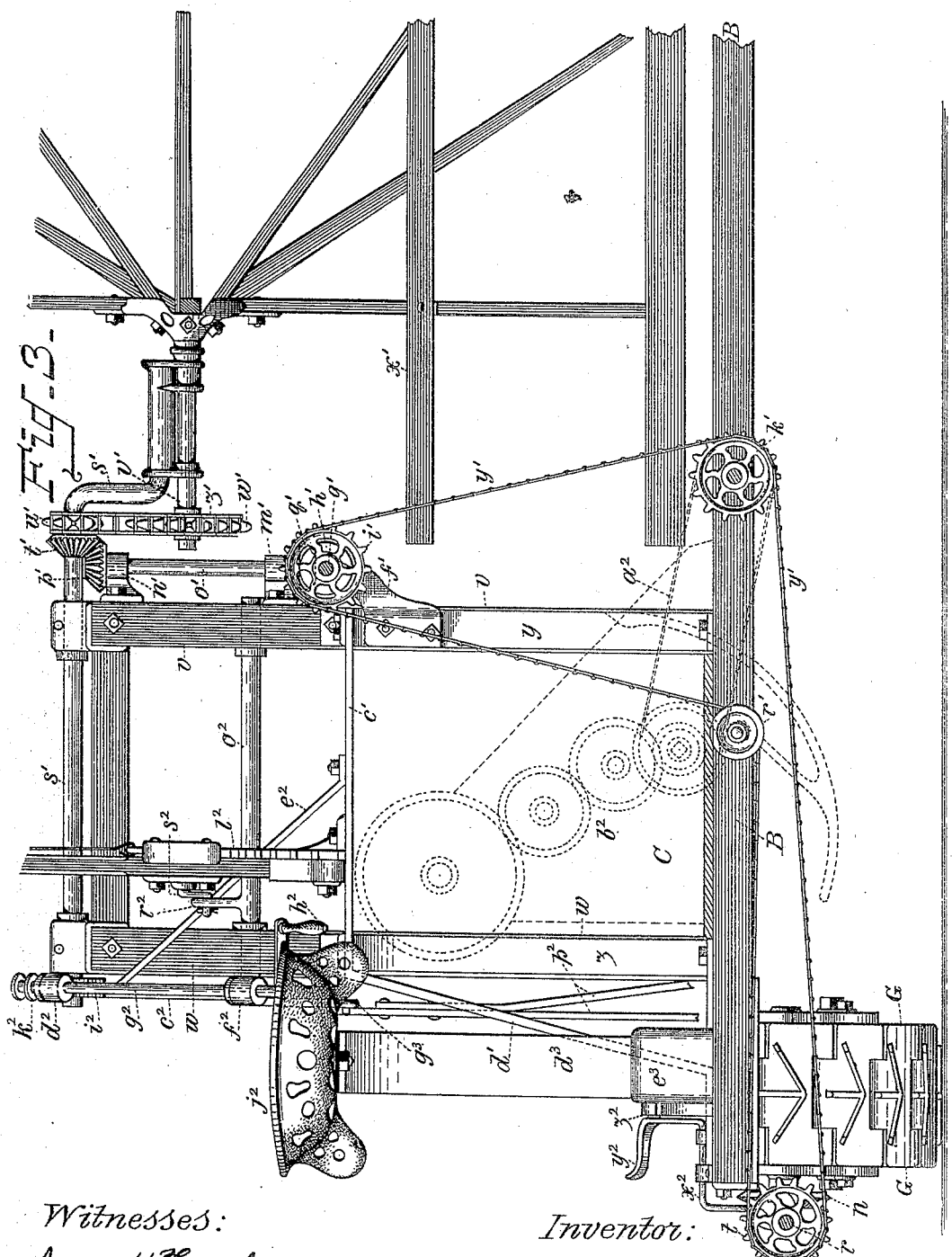
Figure 4:
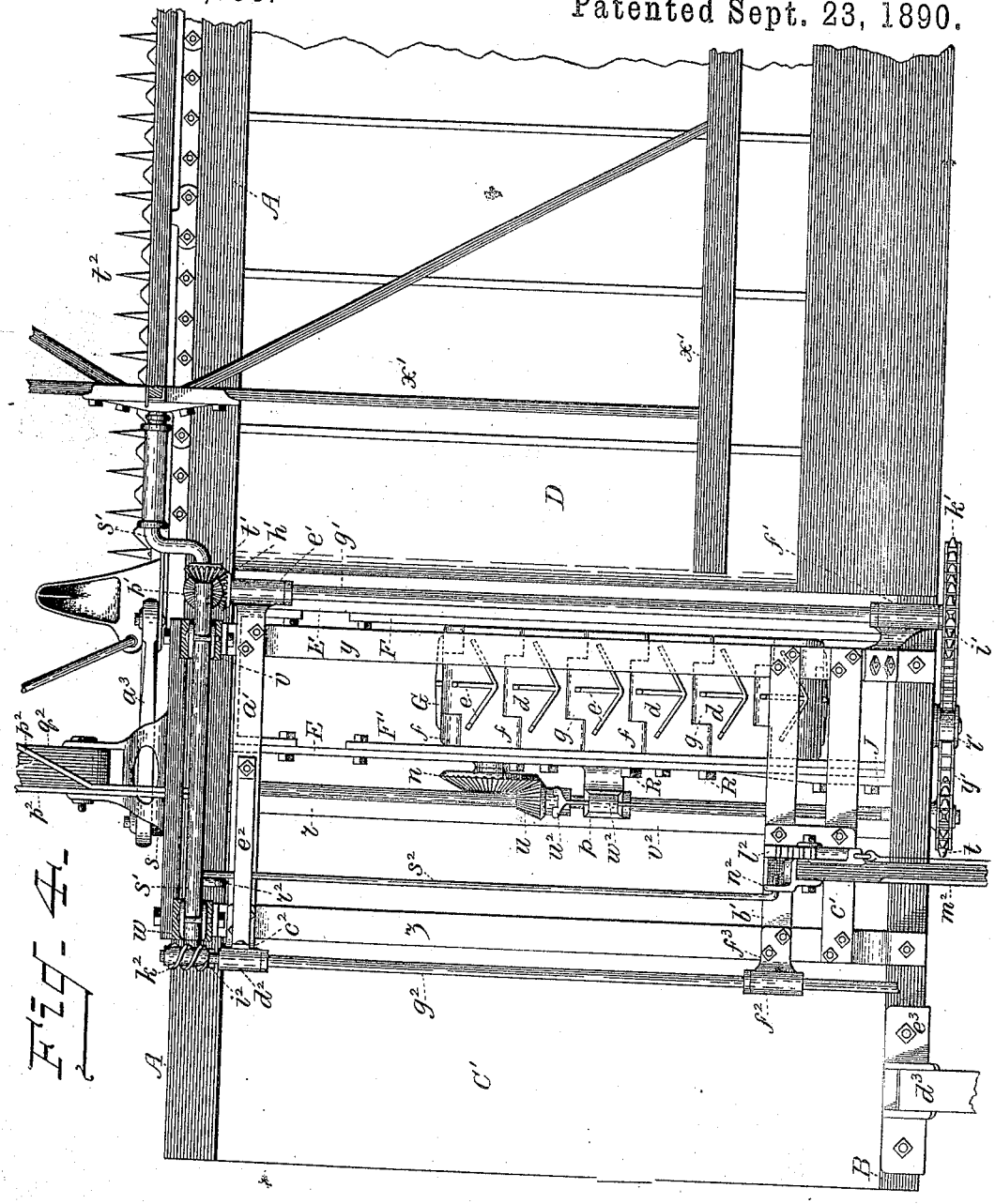
Figure 5:
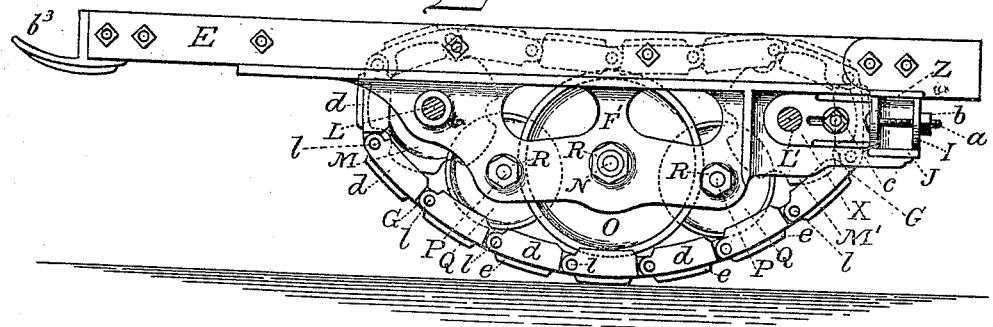
Figure 6:
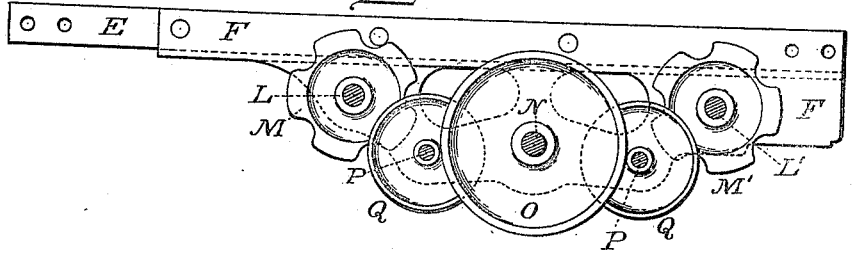
Figure 7:
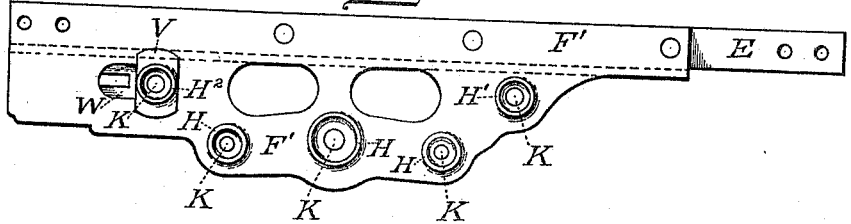
Figure 10:
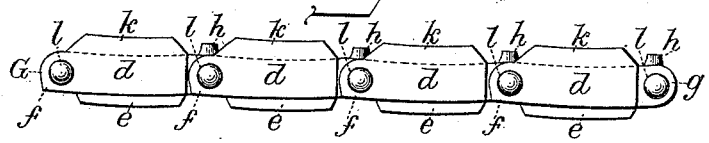
Figure 11:
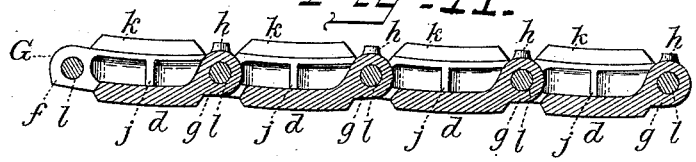
Figure 12:
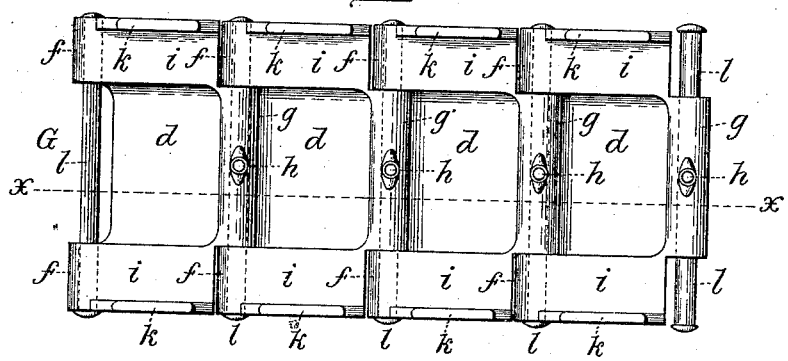
Figure 13:
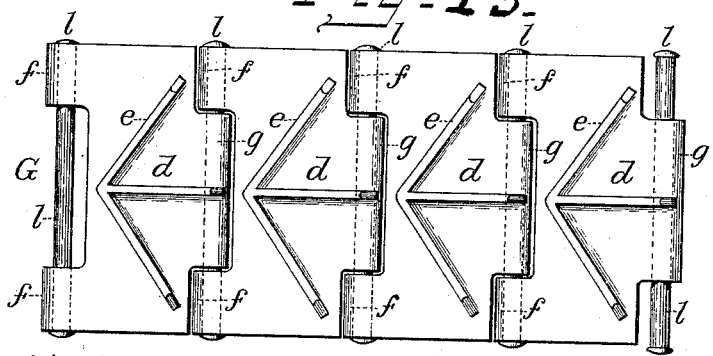
Figure 14:
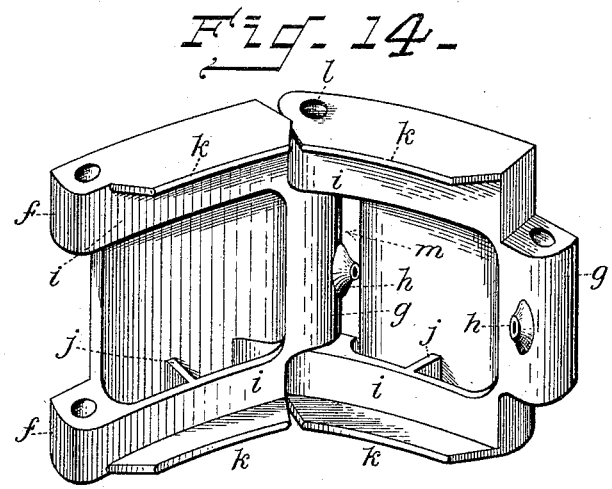
Figure 15:
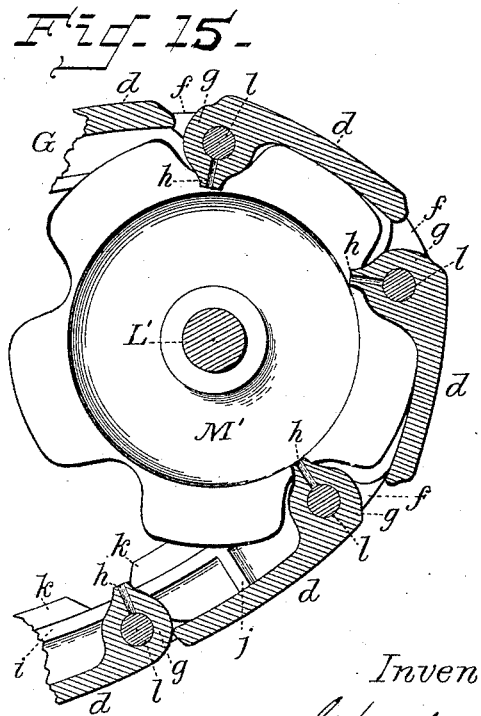

Figure 1 is a plan view of the harvester, showing the continuous track and its mechanism located outside of the space whereon the binding mechanism is carried, the details of which latter I have not deemed it of essential importance to show, the whole being drawn on a scale of one and one-fourth inch to one foot. Fig. 2 is a binder-end elevation of Fig. 1, drawn on a scale of one and one-half inch to one foot. Fig. 3 is a rear elevation of Fig. 1, drawn on a scale of one and one-half inch to one foot. Fig. 4 is a plan view of the harvester, showing the continuous track and its mechanism located between the cutter parts of the harvester and the space provided for the binding mechanism, the same being drawn on a scale of one and one-fourth inch to one foot. Fig. 5 is an elevation taken from the binder end of the harvester-frame, and shows the continuous track and its internal mechanism, the same being drawn on a scale of one and one-half inch to one foot. Fig. 6 is an elevation of the interior mechanism connected with the continuous track, which is removed, together with the outer depending side thereof, the same being drawn on a scale of one and one-half inch to one foot. Fig. 7 is an interior view of the removed outer depending side of Fig. 6, showing the boss-bands formed thereon, the same being drawn to a scale of one and one-half inch to one foot. Fig. 8 is a plan view of the frame-work, the depending sides, and the interior mechanism of the continuous track, the same being drawn on a scale of two inches to one foot. Fig. 9 is a side elevation of Fig. 8, taken from the binder end of the harvester and drawn on a scale of two inches to one foot. Fig. 10 is a side elevation of four links or members of the continuous track connected or hinged to each other as operated, and drawn on a scale of three inches to one foot. Fig. 11 is a longitudinal section of Fig. 12 in the direction of the dotted line $x$ $x$, said Fig. 12 being a plan view of Fig. 10, the whole being drawn on a scale of three inches to one foot. Fig. 13 is an outside plan view of Fig. 10, drawn on a scale of three inches to one foot. Fig. 14 is a perspective view of two of the links or members of the continuous track, said links or members being shown flexed as they pass over the ends of the sprocket-wheels which form a part of the interior mechanism connected with the continuous track, and also showing the open space afforded between the pivoted points of the said links or members of the continuous track, whereby the same are cleared of any accumulation of straw or dirt as the continuous track passes over the ground; and Fig. 15 is an elevation of one head of one of the sprocket-wheels, together with a section of the continuous track flexed about the contact periphery of the same.

Similar letters refer to similar parts throughout the several views.

A is the forward sill of the harvester frame-work, and B the rearward sill of the same.

C is the space provided upon the harvester frame-work for the binder parts $b^2$ (shown in dotted lines in Fig. 3) when the same are located between the continuous track G and the conveyer-canvas D.

The forward and rearward sills of the harvester frame-work A and B are substantially connected together at the binder ends of the harvester by a frame-work E, which also serves to carry depending sides F F', which said depending sides support the mechanism around which the continuous track G travels when in operation. The depending sides F F' are constructed and formed substantially after the manner shown in Figs. 5, 6, and 7, and are severally secured in proper position to the inner sides of the frame-work E by suitable bolts. On their inner faces the depending sides F F' are provided with suitable corresponding boss-bands H H' H², as shown in Figs. 7 and 8, the object of which will be presently described. At their rearward ends the depending sides F F' are provided with ears I and ways J, the object of which will be presently described.

Through suitable holes K, which are formed through the depending sides F F', and within the several boss-bands H, H', and H², pass the shafts L L' of the sprocket-wheels M M', the shaft N of the main supporting-wheel O, and the shafts P P of the friction-wheels Q Q, said several shafts, excepting the shafts L and L', being shouldered and threaded at their ends and held in proper position between the depending sides F F' by suitable nuts R R R, &c. The shaft L of the sprocket-wheel M is arranged so as to rotate therewith, whereby motion may be conveyed from it to the several operative parts of the harvester. The shaft L' of the sprocket-wheel M' may be likewise arranged if found desirable. The shafts N and P are preferably stationary, the main supporting-wheel O and the friction-wheels Q Q, which they support in place, being allowed to rotate freely thereon.

The main supporting-wheel O and the two friction-wheels Q Q are severally provided with hubs S S S, which are suitably furnished with oil-holes T T T, said hubs being extended outside the heads of their respective wheels into the several boss-bands H H', &c., provided on the inner faces of the depending sides F and F', as already described. This arrangement serves to afford means whereby dirt and other foreign substances are excluded from the journals of the main supporting-wheel O and the friction-wheels Q Q. The sprocket-wheels M and M' are also provided with hubs U U, which may be substantially keyed or otherwise secured to their respective shafts L and L', in order that they may rotate therewith, said hubs U U being extended at either side of the heads of the sprocket-wheels M and M' into their respective boss-bands H' and H², for the same end as already set forth.

The boss-bands H² are formed on movable way-pieces V, which move freely back and forth in the slots W, formed for the purpose in the depending sides F and F', as shown clearly in Fig. 7. When the shaft L' of the sprocket-wheel M' is in position, the boss-bands H² and the way-pieces V, by the extension of the said shaft L' at either side, are brought into working connection with the way-pieces X, which are provided on the outer faces of the depending sides F and F', as shown in Figs. 2, 5, and 9.

The way-pieces X are provided with slots Y and ears Z. Through each of the ears Z passes a bolt $a$, which said bolts also pass through ears I, formed on the rear ends of the depending sides F and F', where the whole is held in desired lateral adjustment by means of the nuts $b$, provided for the purpose on the bolts $a$. The object of this arrangement is to provide for the taking up of any slack in the continuous track G when such slack may be caused from the wear or otherwise of the several hinged members of the said continuous track G, which said hinged members or links will be presently described. The said take-up may be accomplished, as will be readily seen, by screwing up on the nuts $b$, provided on the ends of the bolts $a$, and the way-pieces V and X, thus actuated, be then firmly secured in desired position by means of the bolts and nuts $c$ of the slots Y provided for the purpose. The way-pieces X move in the ways J provided on the outer faces of the rear ends of the depending sides F and F', so that a lateral uniform position of the several parts of the take-up devices is readily assured.

The continuous track G is composed of a series of links $d$ $d$, &c., which are substantially hinged to each other, as hereinafter described, and severally constructed as follows: Referring to Figs. 10, 11, 12, 13, 14, and 15, the links $d$ $d$, &c., it will be seen, are slightly convex in their outer contour, and are each provided on their outer faces with lugs $e$ $e$ $e$, &c., whereby they are brought into tractive contact with the ground. Each link $d$ is further provided with two ears $ff$ and an eye $g$, which said eye $g$ is furnished with an oil-hole $h$. The inner faces of the links $d$ $d$, &c., are furnished on either side with tracks $i$ $i$, &c., of a suitable height, and which, for the purpose of securing lightness and strength, are connected thereto by means of webs $j$ $j$, &c. The said tracks $i$ $i$, &c., are provided on their outer edges with projecting flanges $k$ $k$, &c., as shown, the purpose of which will presently be seen. The links $d$ $d$, &c., are hinged together by means of bolts $l$ $l$, &c., which pass through the respective ears $ff$, &c., and eyes $g$ $g$, &c., of the said links $d$ $d$, &c. The said bolts $l$ $l$, &c., are provided on one end with a head, and when placed in position, as already described, their outer ends are upset, so as to assure their position in working place.

The main supporting-wheel O, the friction-wheels Q Q, and the sprocket-wheels M and M' are arranged between the two depending sides F and F' with relation to each other substantially as shown in Fig. 8. It will be observed that the heads of the friction-wheels Q Q come within and close to the inner sides of the heads of the main supporting-wheel O, and that the heads of the sprocket-wheels M and M' are so arranged as to come within the inner sides of the heads of the friction-wheels Q Q. This arrangement is for contracting as much as possible the length of the continuous track G and its tractive periphery, so as to bring the harvester and binder parts as close to the ground as practicable.

The distance between the outside of the heads of the main supporting-wheel O is quite the same as the space afforded between the inner sides of the flanges *k k*, &c., placed on either outer side of the tracks *i i*, &c., of the several links *d d*, &c., and the distance between the inner sides of the heads of the friction-wheels Q Q is quite the same as the distance between the inner sides of the tracks *i i*, &c., of the several links *d d*, &c. It will thus be observed that as a matter of fact the several hinged and connected links *d d*, &c., of the continuous track G afford, through the several tracks *i i*, &c., placed on either side thereof, a continuous double path upon which the main supporting-wheel O and the friction-wheels Q Q travel as the harvester is drawn over the ground, the width of said track or path on either side of the several hinged links of the continuous track being equal to that of the joint faces of one of the heads of the main supporting-wheel O and one of the heads of the friction-wheels Q Q on either side.

The sprocket-spaces in the sprocket-wheels M and M' are so distanced as to engage regularly upon the eyes *g g*, &c., of the several links *d d*, &c., of the continuous track G, the distance between the outer sides of the heads of the said sprocket-wheels M and M' being substantially the same as the distance between the inner sides of the tracks *i i*, &c., of the several links *d d*, &c., of the continuous track G.

The centers of the shafts P P, which support the friction-wheels Q Q, being placed below the center of the shaft N of the main supporting-wheel O, and the centers of the shafts L and L', which support the sprocket-wheels M and M', being placed above the center of the said shaft N, and besides the diameters of the heads of the friction-wheels Q Q being such as to allow of their free rotation inside of the heads of the main supporting-wheel O, and the diameters of the heads of the sprocket-wheels M and M' being such as to allow of their free rotation inside of the heads of the friction-wheels Q Q, it will be readily seen that the continuous track G, when arranged in working position with said main supporting-wheel O, friction-wheels Q Q, and sprocket-wheels M and M', presents continually to the ground the segment of a circle the center of which is considerably above the horizontal plane of the conveyer-canvas D. The upper length of the continuous track G assuming a horizontal plane from its points of engagement with the sprocket-wheels M and M', it will be readily seen that I am thus enabled to bring the main frame-work of the harvester and binder parts as near as practicable to the ground and still avail myself of the tractive power and support of the segment of a circle, which thus practically supersedes the objectionable "bull-wheel" ordinarily used, no part of which shall rise above the harvester frame-work to offer obstruction to the continuous flow of the cut grain to the binder devices or to the practical operation of the said binder devices and harvester parts.

As the links *d d*, &c., of the continuous track G are flexed over the sprocket-wheels M and M', the joints between the eyes *g g*, &c., and the outer sides of the several links *d d*, &c., are opened, affording a space *m*, as illustrated in Fig. 14, from which any accumulated dirt or straw may readily fall, the rotative action of the continuous track G as the harvester is being drawn over the ground, and the resulting flexing and unflexing of its several hinged links *d d*, &c., thus serving continually to clear itself of any accumulation of foreign matter.

In Fig. 4 I have shown the continuous track G and its several connected parts, as already described, located between the binder-space C' and the conveyer-canvas D. In this construction it will readily be seen that if found necessary the conveyer-canvas D may be continued directly over the continuous track G to the binder-space C' without interference, and thus carry the cut grain as it falls on the said conveyer-canvas D directly to the binder parts for binding. In this construction, too, I aim to equalize the weight of the harvester frame-work and the cutting apparatus on the one side of the continuous track G and the weight of the binding mechanism on the other side of the said continuous track G for the purpose of preserving a balance between the harvester and binder parts. In Fig. 1 I have shown the continuous track G placed on the outer side of a binder-space C. In either case, whether the continuous track G be centrally located, as already described, or located as shown in Fig. 1, the connected operative and supporting parts are substantially the same, so far as shown, and bear the same reference-letters.

On the outwardly-extended end of the shaft L of the sprocket-wheel M is properly secured the bevel driving-gear *n*, which is constructed of a suitable size. A hanging box *o* is provided on the outer end of the forward sill A of the harvester frame-work, and in alignment with it is provided a box *p* on the outer face of the depending side F', and a hanging box *q* on the outer end of the rear sill B of the harvester frame-work. Through the said boxes *o*, *p*, and *q* is passed the shaft *r*, upon the forward end of which is placed the pitman-head *s* and upon the rear end the sprocket-wheel *t*. The pitman-head *s* is connected with the cutting apparatus $t^2$ by means of the pitman $a^3$ after the usual manner. The said shaft *r* is driven by means of the bevel-pinion *u*, placed in working position thereon and engaging with the bevel driving-gear *n* of the shaft L of the sprocket-wheel M.

Two reel-supporting posts *v* and *w* are provided and substantially secured at their bottom ends in a suitable working position on the forward sill A of the harvester frame-work. The said reel-supporting posts $v$ and $w$ are further secured in desired working placement by a suitable frame-work $y$ and $z$, which passes from said reel-supporting posts $v$ and $w$, above the binder-space C, Fig. 1, to a point above the rear side of the harvester, whence it is deflected downwardly and firmly secured by suitable bolts to the rear sill B of the harvester frame-work, as clearly shown in Fig. 2. $y$ is the inner member, and $z$ the outer member, of the said frame-work, while $v$ is the inner and $w$ the outer reel-supporting post. The said frame-work $y$ and $z$ is further strengthened by a forward tie-piece $a'$ and by two similar tie-pieces $b'$ $c'$, which are placed near its rearward end, and the whole substantially secured from any lateral rack by an outward and downward extension $d'$ of the forward tie-piece $a'$, the foot of which is securely bolted to the forward sill $a$ of the harvester frame-work.

At the junction of the forward tie-piece $a'$ with the inner member of the frame-work $y$ a suitable bearing $e'$ is provided, and at the deflected end of said inner member of the frame-work $y$ a similar bearing $f'$ is provided in horizontal alignment with the said bearing $e'$. The bearings $e'$ and $f'$ serve to support the shaft $g'$, which is provided at its forward end with a bevel-gear $h'$ and at its rearward end with a sprocket-wheel $i'$.

$j'$ is the inner roller of the conveyer-canvas D, the shaft of which is extended at its rearward end for the placement thereon of a sprocket-wheel $k'$ and a sprocket-wheel $l'$, the functions of which will be presently described.

About midway of the binder-space C and on the outer side of the rear sill B of the harvester frame-work an idler-pulley $r'$ is properly secured, the office of which will be presently designated.

On the cutter side of the inner reel-supporting post $v$ (see Fig. 3) I provide two boxes $m'$ and $n'$, through which passes the vertical shaft $o'$, upon the upper end of which is placed a bevel-gear $p'$ and upon the lower end a bevel-gear $q'$, which latter engages with the bevel-gear $h'$ of the shaft $g'$.

A crank-shaft $s'$ is carried in suitable bearings on the upper ends of the reel-supporting posts $v$ and $w$, and on it is placed, in working engagement with the bevel-gear $p'$ of the vertical shaft $o'$, a bevel-gear $t'$, which has formed with it a small sprocket-wheel $u'$ upon its cutter side.

To the cranked end of the crank-shaft $s'$ is properly hung the reel-shaft $v'$, on which is arranged, in line with the small sprocket-wheel $u'$, the larger sprocket-wheel $w'$. $x'$ is the reel, and $z$ is the sprocket drive-chain connecting the sprocket-wheels $u'$ and $w'$.

A sprocket drive-chain $y'$ is provided at the rear of the harvester, which passes from the sprocket-wheel $t$ of the shaft $r$ under and onto the sprocket-wheel $k'$ on the extended shaft of the conveyer-canvas roller $j'$, from whence it is continued upward and over the sprocket-wheel $i'$ of the shaft $g'$, from which point it continues downward and under the idler-pulley $r'$ to the point of beginning on the sprocket-wheel $t$ of the shaft $r$. By means of this drive-chain connection the proper motion is conveyed to the conveyer-canvas B, to the sprocket-wheel $l'$, from which the binder parts $b^2$ are driven by a suitable sprocket-chain $a^2$, (shown in dotted lines in Fig. 3,) and to the shaft $g'$. The rotation of the shaft $g'$ causes the rotation of the vertical shaft $o'$ through the engagement of the bevel-gears $h'$ and $q'$, provided on the ends of said shafts, and through the engagement of the bevel-gear $p'$ on the upper end of the vertical shaft $o'$ with the bevel-gear $t'$ on the crank-shaft $s'$ the small sprocket-wheel $u'$, with which said bevel-gear $t'$ is connected, is caused to rotate on said crank-shaft $s'$, and, by means of the sprocket drive-chain connection $z'$ with the fixed sprocket-wheel $w'$ on the reel-shaft $v'$, thus cause the reel $x'$ to revolve.

On the forward end of the outer member of the frame-work $z$ is secured an upright standard $c^2$, which has formed on its upper end a box $d^2$, the said upright standard $c^2$ being assured of its position by means of a suitable brace $e^2$. Near the rear end of the outer member of the frame-work $z$ is secured a shorter standard $f^3$, having formed on its upper end a box $f^2$. Through the boxes $d^2$ and $f^2$ passes the inclined shaft $g^2$, which is turned at its rear end into a hand-crank $h^2$, and is provided at its forward end with a worm $k^2$, which engages with a worm-gear $i^2$, placed on the outer end of the crank-shaft $s'$. (See Fig. 2.) By this arrangement of parts the driver in his seat $j^2$ can readily, by means of the hand-crank $h^2$, through the connections already described, control the elevation or depression of the reel $x'$ at his pleasure.

A notched quadrant $l^2$ is provided and secured in a proper working position on the rearward tie-pieces $b'$ $c'$. Pivoted at the center of said notched quadrant $l^2$ is the foot of the tilting hand-lever $m^2$, which is provided with an ordinary plunger, which engages in the notches of the notched quadrant $l^2$ and is actuated by the usual link and thumb-piece connection near the upper end of the tilting hand-lever $m^2$.

An eye-piece $n^2$ is bolted to one side of the tilting hand-lever $m^2$ in proper position. Between and supported by the reel-supporting posts $v$ and $w$ is properly adjusted a tilting shaft $o^2$, which is turned into a downward arm $g^3$ on the outer side of the outer reel-post $w$ and pivoted to tilting bars $p^2$, which tilting bars $p^2$ are pivoted at their opposite ends at a suitable point on the pole $q^2$.

At nearly right angles to the downward arm $g^3$ of the tilting shaft $o^2$ the said tilting shaft $o^2$ is furnished with an arm $r^2$, which is on the inner side of the outer reel-supporting post $w$. The end of said arm $r^2$ is connected by means of a link-rod $s^2$ to the eye-piece $n^2$ of the tilting hand-lever $m^2$. By this arrangement of parts the tilting of the cutting mechanism $t^2$ and the whole harvester-frame is provided for and within convenient access and control of the driver in his seat $j^2$.

The engagement and disengagement of the bevel-pinion $u$ with the bevel driving-gear $n$ on the sprocket-wheel shaft L is provided for by the following mechanism: The bevel-pinion $u$ can be moved forward and backward on the shaft $r$ and still be actuated by said shaft through a suitable arrangement of fixed keys formed on the shaft $r$, and on which said keys pass suitable slots formed in the hub of the bevel-pinion $u$. On the outer side of the hub of the bevel-pinion $u$ is formed a seat in which engages a fork $u^2$, which is formed on the end of a rod $v^2$. The rod $v^2$ is supported and assured of a working position by suitable superimposed bearings $w^2$ $w^2$, formed on the boxes $p$ and $q$ for the purpose. The rear end of the rod $v^2$ is suitably connected with a cranked piece $x^2$, which is substantially boxed on the upper side of the outer end of the rear sill B of the harvester frame-work and terminates at its upper end in a springing foot-piece $y^2$, which bears against a quadrant-piece $z^2$, suitably placed in position on the rear sill B of the harvester frame-work and furnished with suitable stops. By this arrangement of parts it will be readily seen that the engagement and disengagement of the operative parts of the harvester and binder may be readily effected and controlled by the foot of the driver when in the seat $j^2$.

By referring to Fig. 8 it will be observed that the frame-work E E is arranged at either end with shoes $b^3$ and $c^3$, by means of which the said frame-work E E is substantially bolted or otherwise fastened to the forward and rearward sills A and B of the harvester frame-work.

The seat-spring $d^3$ is substantially secured to a foot $e^3$, which is placed and secured in desired position on the upper side of the rear sill B of the harvester frame-work, as clearly seen in Figs. 2, 3, and 4.

From the above detailed description of the several parts of my improvements it will readily be seen that when the hinged continuous track is adjusted in proper working position between the two depending sides, which support the main supporting-wheel, the two friction-wheels, and the two sprocket-wheels, motion is conveyed to the whole as the harvester is drawn over the surface of the ground. The hinged links thus form a continuous double track, upon which the main supporting-wheel and the friction-wheels rotate on their respective shafts. By the engagement of the eyes of the several hinged links of the continuous double track with the forward and rearward sprocket-wheels they are caused to rotate together with their respective shafts, which said shafts may be extended individually or collectively for conveying, by means of suitable mechanical connections, motion to the harvester and binder parts, as already suggested.

It will be seen from an examination of the drawings, which are made to a scale, and the description of the chain and wheels, that it is peculiarly well adapted to the purposes to which it is applied. The hinged track is so combined with the main wheel and friction and sprocket wheels that it travels in the arc of a circle from the front sprocket-wheel to the rear sprocket-wheel, the center of the circle of which it is the arc being located above the harvester-frame, the hinged track traveling from the rear sprocket-wheel to the front sprocket-wheel in a nearly-horizontal path, which is below the upper surface of the harvester-frame.

It will be seen that the machine has not only the supporting and driving power of a wheel forty inches in diameter and a rim nine inches wide, but can be as readily turned short around at the corners as an ordinary wheel of that diameter.

I am aware that inventors have in a few cases claimed that their traction-wheels are applicable to mowing and reaping machines; but none to my knowledge have shown how a traction-wheel can be applied, or, when applied, could be used to drive the necessary mechanism to perform the work, or how the machine could be turned around at the corners, as it must be for practical use.

What I claim as my invention, and desire to secure by Letters Patent of the United States, is—

1. As a substitute for the main supporting and driving wheel in common use in harvesters, the following combination and arrangement of devices: a main supporting-wheel on an axle carried in depending side pieces below the harvester-frame, the friction-wheels and sprocket-wheels in front and rear of said main wheel, with their axles supported in the same way by the same means, and the endless chain provided with a double track for the main wheel to travel upon, said chain moving over the tops of the sprocket-wheels below the top of the harvester-frame in a nearly-horizontal course and below the sprocket-wheels and under the main and friction wheels in the arc of a circle the center of which is above the harvester-frame, substantially as shown and described.

2. In combination with the harvester-frame carrying cutting, gathering, conveying, and binding devices, the main wheel and friction-wheels in the front and rear of it, each on separate axles, which are supported by the depending side pieces below the harvester-frame, the endless chain, provided with a double track on which said wheels travel, and sprocket-wheels in front and rear of the main and friction wheels and over which the endless chain travels, the front sprocket-wheel receiving motion from the endless chain, said sprocket-wheel carrying on its shaft a bevel-wheel which meshes with the bevel-pinion on the cutter crank-shaft, substantially as shown and described.

3. In combination with a harvester-frame, the main supporting-wheel having its axle supported in depending side pieces below said frame, the friction-wheels in front and rear of said wheel, the axles of which are supported in the same manner, the sprocket-wheels in front and rear of said friction-wheels, the axles of which are below the harvester-frame, and the endless-chain track on which the main supporting-wheel and friction-wheels travel, said endless chain being constructed with double ways or tracks $i$ on its internal surface and lugs $e$ on its external surface, the chain below the sprocket-wheels traveling in the arc of a circle the center of which is above the harvester-frame and across the sprocket-wheels in nearly a horizontal path below the top of the harvester-frame, as shown and described.

4. In combination with the harvester-frame, the supporting-wheel composed of two disks or wheels arranged to revolve in unison in separate vertical planes on an axle supported in depending side pieces below the harvester-frame, two friction-wheels constructed in the same way arranged to revolve between the disks of the main wheel on axles in front and rear of the main wheel and below the harvester-frame, two sprocket-wheels constructed in the same way and arranged to revolve between the disks of the friction-wheels and below the harvester-frame, and the endless chain constructed with elevations on its internal surface as tracks for the treads of the main and friction wheels to travel upon, substantially as shown and described.

5. As a substitute for the main supporting-wheel in a harvester, the main wheel on an axle carried in depending side pieces below the harvester-frame, the friction-wheels in front and rear of said wheel, the sprocket-wheels in front and rear of the friction-wheels, the shafts of the friction and sprocket wheels supported in the depending side pieces below the harvester-frame, the front sprocket-wheel carrying on its shaft outside of the depending side piece a bevel-wheel, which meshes with a bevel-pinion on the cutter crank-shaft, the endless chain driving the sprocket-wheel, and a track for the main and friction wheels to travel on, formed with elevated ways on the edge of each and depressions between the ways, and the eye-pieces into which the elevations of the sprocket-wheels enter in the passage of the chain over them, substantially as shown and described.

6. In a harvester, in combination with the main supporting-wheel and friction-wheels in front and rear of it and the sprocket-wheels in front and rear of the friction-wheels, each provided with an axle supported in depending side pieces below the harvester-frame, the endless-chain track, constructed as described, passing over the sprocket-wheels and under the main and friction wheels and serving as a track for them to travel on, the way-pieces X, adjusting-bolt $a$, and ears I Z, the whole arranged and combined for joint operation substantially as set forth.

7. In combination with the harvester-frame and the main supporting-wheel, two friction and two sprocket wheels with their axles supported below said frame in depending side pieces near enough to each other for the friction-wheels to project between the disks of the main wheel, and the sprocket-wheels between the disks of the friction-wheels, and the endless chain composed of short links hinged together by the ears $f$ and eyes $g$ and provided with elevations or tracks having a flange or rib $k$ on the outer edge of each elevation, substantially as shown and described.

8. In a frame-work connecting the forward and rearward sills of a harvester, the combination of two depending sides provided with boss-bands and holes, the main supporting-wheel, the two friction-wheels, the two end sprocket-wheels, and hinged endless-chain double track, the whole arranged and combined for joint operation substantially as herein described and shown.

9. In combination with the harvester-frame carrying the cutting, gathering, conveying, and binding devices, the main supporting-wheel, the friction-wheels, and sprocket-wheels on axles supported in depending side pieces below the harvester-frame, the endless chain passing under the main and friction wheels and over the sprocket-wheels serving as a track for the main supporting-wheel and as a driver for the front sprocket-wheel, which carries on its projecting axle a bevel-wheel meshing with a bevel-pinion on the shaft $r$, provided with the pitman-head $s$ on its forward end to drive the cutters and the sprocket-wheel $t$ on the rear end to drive the gathering, conveying, and binding devices, substantially as shown and described.

10. In a harvesting-machine that carries a cutting and gathering apparatus on the front part of the platform, a conveying-apron behind the cutting and gathering apparatus, and a binding mechanism at the driving-wheel end of the conveying-apron, discharging its bundles outside of the path in which said wheel travels, a substitute for the main supporting and driving wheel in common use, consisting of the endless-chain track, the supporting-wheel, friction-wheels, and sprocket-wheels supported in depending side pieces below the harvester-frame, the endless chain traveling in a path below the top of the harvester-frame and serving as the prime mover for driving the cutting, gathering, conveying, and binding mechanism of the harvester, substantially as shown and described.

In testimony whereof I have hereunto set my hand this 25th day of February, 1888.

CHARLES MILLER.

Witnesses:
FRANK R. RATHBUN,
MARY A. MORRIS.